(12) United States Patent
Vaught et al.

(10) Patent No.: US 11,878,239 B2
(45) Date of Patent: Jan. 23, 2024

(54) REPLAY EDITOR IN VIDEO GAMES

(71) Applicant: Electronic Arts Inc., Redwood City, CA (US)

(72) Inventors: Clayton W. Vaught, Sammamish, WA (US); Cullen J. Waters, Jr., Saint Johns, FL (US); James Lawrence Ricker, Cologne (DE)

(73) Assignee: Electronic Arts Inc., Redwood City, CA (US)

( * ) Notice: Subject to any disclaimer, the term of this patent is extended or adjusted under 35 U.S.C. 154(b) by 34 days.

(21) Appl. No.: 17/649,256

(22) Filed: Jan. 28, 2022

(65) Prior Publication Data

US 2023/0241496 A1    Aug. 3, 2023

(51) Int. Cl.
*A63F 13/497* (2014.01)
*A63F 13/577* (2014.01)
*A63F 13/525* (2014.01)

(52) U.S. Cl.
CPC .......... *A63F 13/497* (2014.09); *A63F 13/525* (2014.09); *A63F 13/577* (2014.09); *A63F 2300/634* (2013.01)

(58) Field of Classification Search
CPC ........ A63F 13/00; A63F 13/25; A63F 13/327; A63F 13/33; A63F 13/332; A63F 13/335; A63F 13/338; A63F 13/34; A63F 13/40; A63F 13/426; A63F 13/45; A63F 13/497; A63F 13/50; A63F 13/52; A63F 13/537; A63F 13/55; A63F 13/60; A63F 13/70; A63F 13/79; A63F 13/86
See application file for complete search history.

(56) References Cited

U.S. PATENT DOCUMENTS

| | | | |
|---|---|---|---|
| 6,699,127 B1 * | 3/2004 | Lobb | A63F 13/45 463/43 |
| 8,591,332 B1 * | 11/2013 | Bright | A63F 13/42 463/31 |
| 2017/0228600 A1 * | 8/2017 | Syed | G06V 20/62 |
| 2022/0066990 A1 * | 3/2022 | Clingman | A63F 13/533 |
| 2022/0165013 A1 * | 5/2022 | Velez | A63F 13/213 |
| 2022/0171960 A1 * | 6/2022 | Nelson | A63F 13/65 |

* cited by examiner

*Primary Examiner* — Omkar A Deodhar
(74) *Attorney, Agent, or Firm* — Lee & Hayes, P.C.

(57) ABSTRACT

A gaming system may allow for a user to capture and/or edit simulation state data of gameplay in a video game such that a replay of the gameplay may be rendered and/or shared. The gaming system may receive simulation state data and a request. The simulation state data may include simulation state(s) which include a model and pose state of an avatar corresponding to a player in a game simulation of a video game previously rendered as rendered view(s). The request may request a replay of the simulation state data with modification(s). The gaming system may modify the simulation state data to generate modified simulation state data and render, based on the modified simulation state data, replay view(s) that differ from the previously rendered view(s). The gaming system may then output the replay view(s) to a display of a computing device.

20 Claims, 6 Drawing Sheets

REPLAY EDITOR IN VIDEO GAMES

BACKGROUND

Video gaming allows for players to play a variety of electronic and/or video games alone or with each other via network connectivity, such as via the Internet. With eSports and general game spectating, games are becoming more than just a playing experience with players wishing to share their gameplay experiences. For example, some games and systems may provide for video capture of gameplay. However, frustration may arise due to the lack of customization and enhancement available for video captures of gameplay.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
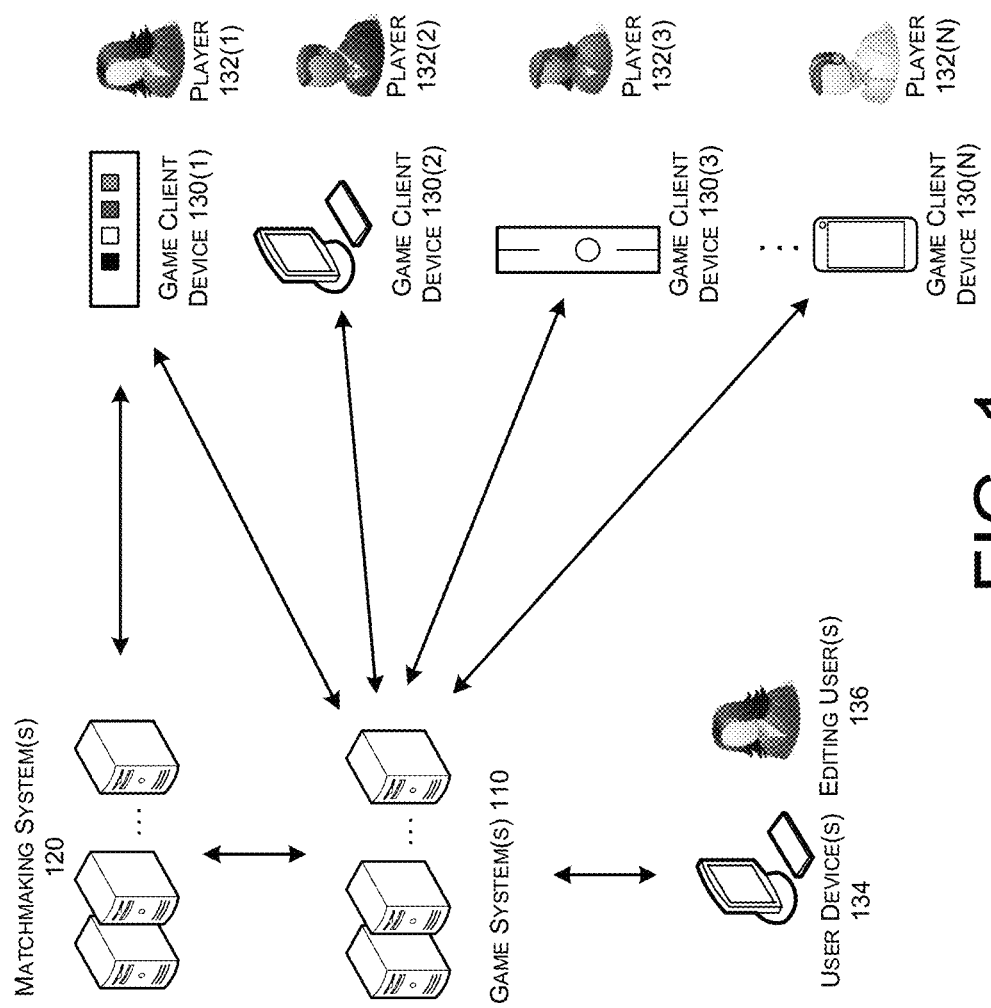
FIG. 1 illustrates a schematic diagram of an example environment with game system(s), matchmaking system(s), and game client device(s) and/or user device(s) that may provide for capturing and/or editing simulation state data of gameplay in a video game such that a replay of the gameplay may be rendered and/or shared, in accordance with example embodiments of the disclosure.

Example embodiments of this disclosure describe methods, apparatuses, computer-readable media, and system(s) for providing a replay editor for video gaming. More particularly, example methods, apparatuses, computer-readable media, and system(s) according to this disclosure may allow for a user to capture and/or edit simulation state data of gameplay in a video game such that a replay of the gameplay may be rendered and/or shared.

For example, during gameplay, a simulation state of the game may be maintained and updated by a simulation engine (also referred to herein as a simulation module). The simulation state may be used to render a view (or frame) that is presented to a player (e.g., to a display device associated with a player). It should be understood that, as used herein, a player can refer to (i) a person playing or participating in a video game; (ii) systems or devices corresponding to, associated with, operated by and/or managed by a player; and/or (iii) accounts and/or other data or collections of data associated with or corresponding to a player. In examples according to this disclosure, the simulation state may also be captured and stored. For example, the simulation state may be captured per view rendered by a rendering module and presented to the player on a display or at other frequencies. The simulation state may include positions and orientations of models and components of models within the simulation state, light sources, camera positions, and so on. Simulation state data, as used herein, may refer to a set of simulation states corresponding to a series of rendered views for a period of time that may be may be captured. The capturing and storing of simulation state data may be performed instead of or in addition to capturing the rendered views presented live to the player during gameplay.

A player or an editing user may utilize a replay editor to subsequently re-render the view of the gameplay presented to the player or to render a modified view of the gameplay which may be based on alterations of the simulation state data. More particularly, the replay editor may bypass the simulation engine and present the previously stored and/or modified simulation state data to the rendering module for rendering of the view or modified view. In some examples, the replay editor may allow the user to modify the simulation state data such that characters, objects or the environment in a simulated game world and the appearances thereof may be manipulated.

For example, the player or an editing user (both hereinafter collectively referred to as a user) may add a tag, visualization or other item to the simulation state(s) that may be included in a modified view. In some examples, additional item(s) added to the simulation state(s) may be added in relation to existing item(s) in the simulation state(s). In a particular example, a user may utilize the replay editor to add an emoji to the captured simulation state data that is to be pinned to an avatar corresponding to the player (e.g., a smiley emoji over the avatar's face from a camera's perspective).

In another example, the user may utilize the replay editor to use an alternative or add an additional camera and/or camera position, to remove an obstruction from view, to insert effect(s) (e.g., slow motion, background fade, multi-view, etc.) and/or to change or add light source(s). In a particular example, a user may wish to share a ten second clip of the user performing various tricks in a first person perspective skateboarding game. The user may provide input to the replay editor to modify the camera from a first person perspective to a third person perspective, to control the camera position and orientation throughout the ten seconds of simulation state data, to turn off and on the visibility of a wall that would otherwise obstruct a desired view of the trick(s) and to add a spotlight and a slow motion effect during the final trick of the clip. The replay editor may implement the modifications as changes to the simulation state data being provided to the rendering module such that a rendered modified view may be generated with the desired presentation of the captured gameplay.

The feature replay editor techniques described herein can improve a functioning of a computing device by providing additional functions for sharing gameplay experiences. As discussed above, the modified view of the captured gameplay provided by techniques herein may allow for changes in the simulation state data to allow refined, enhanced or otherwise customized presentation of gameplay the user is sharing. For example, the user may make changes to the skin of avatars, the textures decorating the environment, and any number of other aesthetics in the gameplay. Further, because the systems and techniques herein capture simulation state data, the captured simulation state data may be used across multiple versions of a game (e.g., where the versions share the same or similar simulation state data format) by potentially eliminating dependencies on version or game patches and may enable captured gameplay to be used in future releases of a game, for example, with updated graphics of the future title being applied to the captured gameplay of the older release. For example, the stored simulation state data from a 2020 release of a game may be replayed in a 2022 release of the game, with the updated graphics of the newer release. These and other improvements to the functioning of the computer are discussed herein.

As described in further detailed below, the systems and methods described herein are presented for exemplary and illustrative purposes; they are not indicative of applicant's product or implementation plans. Moreover, it should be understood that any reference herein to the use of player or user data would be in compliance with privacy policies that respect players' privacy, and in accordance with player privacy settings or preferences.

Certain implementations and embodiments of the disclosure will now be described more fully below with reference to the accompanying figures, in which various aspects are shown. However, the various aspects may be implemented in many different forms and should not be construed as limited to the implementations set forth herein. For example, some examples provided herein relate to sport, fighting or shooting games. Implementations are not limited to the example genres. It will be appreciated that the disclosure encompasses variations of the embodiments, as described herein. Like numbers refer to like elements throughout.

FIG. 1 illustrates a schematic diagram of an example environment 100 with game system(s) 110, matchmaking system(s) 120, and game client device(s) 130 and/or user device(s) 134 that may provide for capturing and/or editing simulation state data of gameplay in a video game such that a replay of the gameplay may be rendered and/or shared, in accordance with example embodiments of the disclosure.

The example environment 100 may include one or more player(s) 132(1), 132(2), 132(3), ... 132(N), hereinafter referred to individually or collectively as player(s) 132, who may interact with respective game client device(s) 130(1), 130(2), 130(3), ... 130(N), hereinafter referred to individually or collectively as game client device(s) 130 via respective input device(s).

The game client device(s) 130 may receive game state information from the one or more game system(s) 110 that may host the online game played by the player(s) 132 of environment 100. The game state information may be received repeatedly and/or continuously and/or as events of the online game transpire. The game state information may be based at least in part on the interactions that each of the player(s) 132 have in response to events of the online game hosted by the game system(s) 110.

The game client device(s) 130 may be configured to render content associated with the online game to respective player(s) 132 based at least on the game state information. More particularly, the game client device(s) 130 may use the most recent game state information to render current events of the online game as content. This content may include video, audio, haptic, combinations thereof, or the like content components. The game client device(s) 130 may further be configured to capture the game state information for use in conjunction with a replay editor functionality. These functions are described in additional detail below.

As events transpire in the online game, the game system(s) 110 may update game state information and send that game state information to the game client device(s) 130. For example, if the player(s) 132 are playing an online soccer game, and the player 132 playing one of the goalies moves in a particular direction, then that movement and/or goalie location may be represented in the game state information that may be sent to each of the game client device(s) 130 for rendering the event of the goalie moving in the particular direction. In this way, the content of the online game is repeatedly updated throughout game play. Further, the game state information sent to individual game client device(s) 130 may be a subset or derivative of the full game state maintained at the game system(s) 110. For example, in a team deathmatch game, the game state information provided to a game client device 130 of a player may be a subset or derivative of the full game state generated based on the location of the player in the game simulation.

When the game client device(s) 130 receive the game state information from the game system(s) 110, a game client device 130 may render updated content associated with the online game to its respective player 132. This updated content may embody events that may have transpired since the previous state of the game (e.g., the movement of the goalie).

The game client device(s) 130 may accept input from respective player(s) 132 via respective input device(s). The input from the player(s) 132 may be responsive to events in the online game. For example, in an online basketball game, if a player 132 sees an event in the rendered content, such as an opposing team's guard blocking the point, the player 132 may use his/her input device to try to shoot a three-pointer. The intended action by the player 132, as captured via his/her input device, may be received by the game client device 130 and sent to the game system(s) 110.

The game client device(s) 130 may be any suitable device, including, but not limited to a Sony Playstation® line of systems, a Nintendo Switch® line of systems, a Microsoft Xbox® line of systems, any gaming device manufactured by Sony, Microsoft, Nintendo, or Sega, an Intel-Architecture (IA)® based system, an Apple Macintosh® system, a netbook computer, a notebook computer, a desktop computer system, a set-top box system, a handheld system, a smartphone, a personal digital assistant, combinations thereof, or the like. In general, the game client device(s) 130 may execute programs thereon to interact with the game system(s) 110 and render game content based at least in part on game state information received from the game system(s) 110. Additionally, the game client device(s) 130 may send indications of player input to the game system(s) 110. Game state information and player input information may be shared between the game client device(s) 130 and the game system(s) 110 using any suitable mechanism, such as application program interfaces (APIs).

The game system(s) 110 may receive inputs from various player(s) 132 and update the state of the online game based thereon. As the state of the online game is updated, the state may be sent to the game client device(s) 130 for rendering online game content to player(s) 132. In this way, the game system(s) 110 may host the online game.

The example environment 100 may further include matchmaking system(s) 120 to match player(s) 132 who wish to play the same game and/or game mode with each other and to provide a platform for communication between the player(s) 132 playing online games (e.g., the same game and/or different games). The matchmaking system(s) 120 may receive an indication from the game system(s) 110 of player(s) 132 who wish to play an online game.

The matchmaking system(s) 120 may attempt matchmaking between player(s) 132. The matchmaking system(s) 120 may access information about the player(s) 132 who wish to play a particular online game, such as from a player database. A user account for each of the player(s) 132 may associate various information about the respective player(s) 132 and may be stored in the player database and accessed by the matchmaking system(s) 120.

Player(s) 132 may be matched according to one or more metrics associated with the player(s) 132 such as skill at a particular game. In addition to or alternatively to skill scores, player(s) 132 may be matched on a variety of other factors. Some example matchmaking factors may be related to behavior in addition to skill and may include a player's playstyle. For example, when matching player(s) 132 as a team for a team deathmatch, the matchmaking system(s) 120 may favor matching player(s) 132 that exhibit similar levels of aggression or a mix of levels of aggression. This may alleviate the frustration experienced by players when deathmatch teams split up due to different players utilizing different tactics. Splitting a deathmatch team into different groups using different tactics can often result in a loss to an opposing team operating as a single unit with a shared tactical approach. The aspects of players' playstyle utilized for different genres or different individual games may vary from example to example.

Some other example matchmaking factors may be character or setup related such as character class, team choice, position or role preference, and so on. For example, when matching player(s) 132 for an online roleplaying game, the matchmaking system(s) 120 may consider the character classes of the player(s) 132. Other matchmaking factors may be related to teammates or teams of the player(s) 132. In an example, the matchmaking may match a player 132 to other players the player 132 plays with regularly.

Having matched the player(s) 132, the matchmaking system(s) 120 may instruct generation of instance(s) of the online game(s) for the match(es). More particularly, the matchmaking system(s) 120 may request the game system(s) 110 instantiate an online game between the matched player(s) 132. For example, the matchmaking system(s) 120 may provide connection information for the game client device(s) 130 to the game system(s) 110 for instantiation of an instance of the online game between the matched player(s) 132. As discussed herein, instances and matches of an online game may be used interchangeably and may refer to a shared gameplay environment in which matched players play in the online game, whether a single map, multiple connected maps, or a gameplay world. In some examples, a server may host the match or instance of the game for the matched players.

As a player 132 engages in additional gameplay, the gaming system(s) 110 may provide the matchmaking system(s) 120 with some or all of the game state information. The matchmaking system(s) 120 may store the game state information or data derived from the game state information. In this manner, behavior data and/or gameplay history for the player 132 may remain up-to-date, even if or as the player's behaviors and playstyle evolve over time.

As mentioned above, the matchmaking system(s) 120 may further provide a platform for communication between the player(s) 132 playing online games (e.g., the same game and/or different games). Depending on the implementation, the matchmaking system(s) 120 may provide a social platform in which player(s) 132 may utilize friends list, communities and/or groups, and other connections to establish relationships with other player(s) 132. The matchmaking system(s) 120 may also provide direct messaging, group messaging, public messaging, chat, and/or other communications functionality to allow player(s) 132 to communicate via the social platform.

In addition, the matchmaking system(s) 120 (or the game system(s) 110) may include in-match communications functionality that may allow player(s) 132 to communicate with other player(s) 132 while in matches or instances of the online game.

As discussed above, the game client device(s) 130 may include functionality to capture game simulation state data and/or allow player(s) 132 to edit simulation state data of gameplay such that a replay of the gameplay may be rendered and/or shared.

Figure 2:
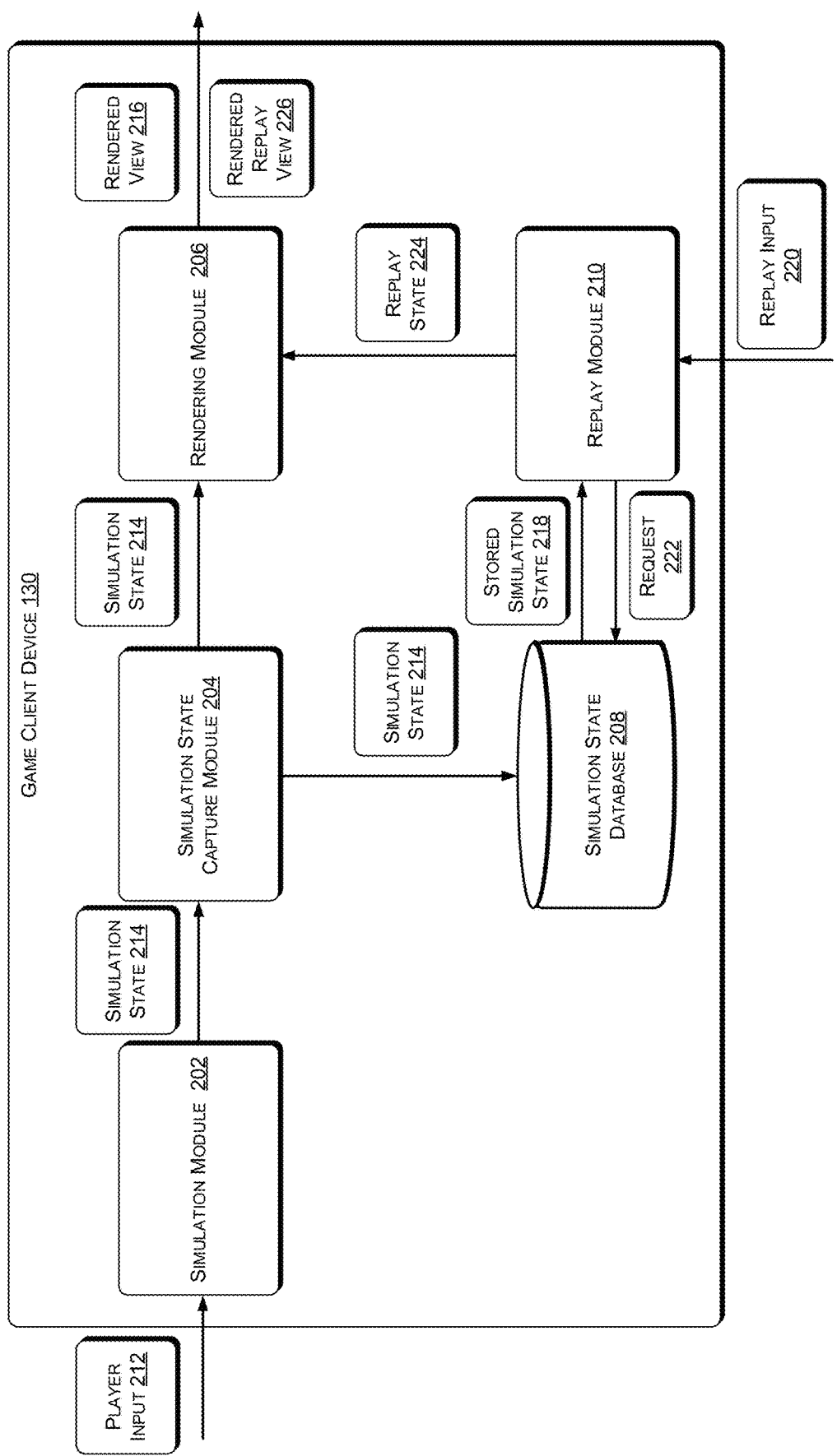
FIG. 2 illustrates a schematic diagram of an example game client device that may include functionality for simulation state data capture and replay generation.

FIG. 2 illustrates a schematic diagram of an example game client device 130 that may include functionality for simulation state data capture and replay generation. As illustrated, the example game client device 130 includes a simulation module 202, a simulation state capture module 204, a rendering module 206, a simulation state database 208 and a replay module 210.

During gameplay, the simulation module 202 may operate to maintain and update a simulation state 214 (e.g., which may be or may be based on the game simulation state discussed above with regard to FIG. 1). In some examples, the simulation module 202 may be a game engine or similar component. The simulation module 202 may receive player input 212 from a player and/or simulation state update data from the gaming system(s) 110. Based on the received input 212 and/or update data, the simulation module 202 may update the simulation state 214. The simulation state 214 may include positions and orientations of models and components of models within the simulation state, light sources, camera positions, and so on. The simulation module 202 may output the simulation state 214 to the simulation state capture module 204. In some examples, the simulation module 202 may output the simulation state 214 to the rendering module 206 with the simulation state capture module 204 capturing the simulation state 214 (e.g., the simulation module 202 may be configured for operations with or without the presence of the simulation state capture module 204).

The simulation state capture module 204 may receive or capture the simulation state data 214 from the simulation module 202. The simulation state capture module 204 may then output the simulation state 214 to the rendering module 206 and to the simulation state database 208. For example, the simulation state 214 may be captured by the simulation state capture module 204 and sent to the simulation state database 208 on a per frame basis, a per rendered view basis and/or at other frequencies.

The rendering module 206 may receive the simulation state 214 and operate to generate, based on the simulation state 214, a rendered view 216 that may include a frame or view that is presented to the player.

The simulation state database 208 may receive and store the simulation state 214. In some examples, the simulation state database 208 may store the simulation state 214 as simulation state data. As mentioned above, the simulation state data, as used herein, may refer to a set of simulation states 214 captured for a period of time that correspond to a series of rendered views presented to the player during live gameplay. Depending on the implementation, the simulation states 214 may be stored permanently or temporarily by the capture process. For example, a game client device 130 may have a limited amount of storage space for storing simulation states 214. In such an example, the simulation state database 208, in absence of input from a user, may overwrite old simulation states with new simulation states on a first-in-first-out basis beginning the temporary storage space fills. In other examples, the simulation state capture module 204 and/or the simulation state database 208 may additionally or alternatively include functionality to prioritize subsets of simulation states 214 based on their content. For example, the simulation module 202 may include information in the simulation state 214 indicating events or other context for the simulation states 214 that may be indicative of whether a player will likely want to share the content of the simulation states 214. In a particular example, the simulation state capture module 204 and/or the simulation state database 208 may determine a simulation state 214 is related to an event such as the player gaining an achievement, the player scoring, the player successfully performing an action such as a complex trick, and so on. Simulation states 214 determined to be related to the event may be stored together as simulation state data and given a higher retention priority than simulation states 214 that are related to, for example, an idle period or a failure event (e.g., a failed attempt at a trick, a loss of possession in an eSports game, etc.).

The replay module 210 may include functionality to allow a user to subsequently re-render the rendered view 216 of the gameplay presented to the player or to render a modified replay view 226 of the gameplay which may include alterations of the simulation state 214. As shown, the replay module 210 may receive replay inputs 220 from a user (e.g., the player or another user). The replay inputs 220 may indicate simulation state data (e.g., a set of simulation states 214) and, in some cases, modifications to the simulation states 214. The replay module 210 may, based on the replay inputs 220, send the request 222 to the simulation state database 208 for the indicated simulation state data. In response, the simulation state data store 208 may provide the requested stored simulation state data 218 to the replay module 210. Then, if instructed by the replay inputs 220, the replay module 210 may modify the simulation state data such that the state of the game world is changed (e.g., changes to one or more of the states of any models, terrain, light sources, cameras, effects, and so on).

As mentioned above, the replay module 210 may bypass the simulation module 202 and output a replay state 224 (which may include any requested modifications) to the rendering module 206. The rendering module 206 may receive the replay state 224 and, based thereon, render and output a rendered replay view 226 to the user. In some examples, the rendering module 206 may receive and process the replay state 224 in the same way the rendering module 206 would receive and process simulation states 214.

The replay module 210 may allow for any number of modifications to the simulation state data which may vary from example to example. As such, examples are not limited in the modifications that may be available to those discussed herein. Further, the replay inputs 220 may be received in series and are not limited in their timing. For example, a first replay input 220 may be received that specifies a set of simulation states 214 to be requested (e.g., via a graphical user interface that may allow for selection of sets of simulation states 214 determined to be related to corresponding events). Once the specified set of simulation states 214 is received, additional replay inputs 220 may be received specifying modifications to be applied, previously added modification to be altered or removed, a clip request that specifies a subset within the set of simulation states 214 to be rendered, and any number of other replay inputs 220 may be received as the user determines a desired presentation for the replay view.

For example, the replay inputs 220 may cause the replay module 210 to add a tag, visualization or other item to the simulation states 214 that may be included in a rendered replay view 226. As mentioned above, simulation states 214 may include the state of the game world including the states of any models, terrain, light sources, cameras, effects, and so on. In some examples, additional item(s) added to the simulation state 214 may be added in relation to existing item(s) in the simulation state 214. In a particular example, a user may utilize the replay module 210 to add an emoji to simulation state data including a set of simulation states 214 such that the emoji is pinned to an avatar corresponding to the player (e.g., a smiley emoji over the avatar's face) throughout the rendered replay views rendered for the modified simulation state data. An example of such a modification is shown in FIGS. 3A and 3B.

Figure 3:
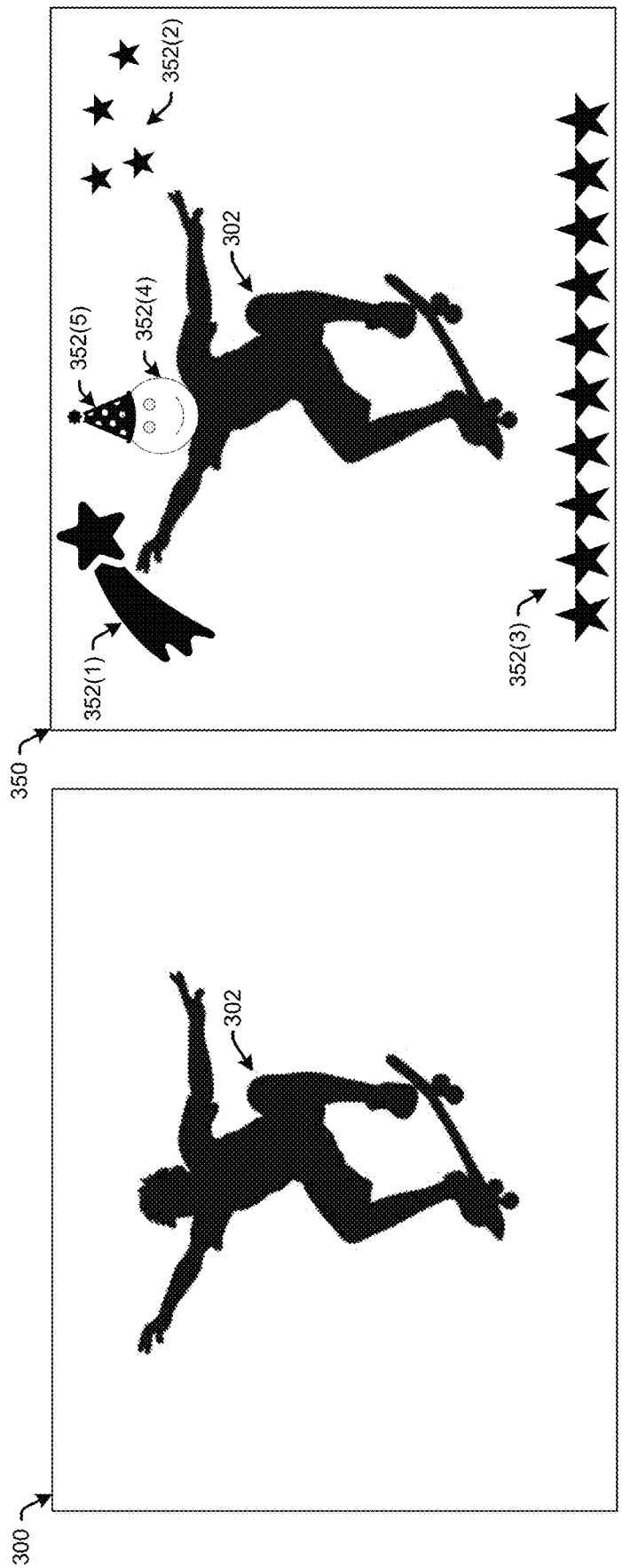
FIG. 3A illustrates a rendered view of a player's avatar in a third person skateboarding videogame.
FIG. 3B illustrates a rendered replay view that may have been rendered based on a modified version of the simulation state corresponding to the rendered view illustrated in FIG. 3A.

More particularly, FIG. 3A illustrates a rendered view 300 of a player's avatar 302 in a third person skateboarding videogame. In an example, the rendered view 300 may have been generated based on a simulation state at a time when the player had successfully performed a difficult trick and may include information for a model of the avatar 302, terrain information of the game world, information for the light sources of the game world, information for the camera, and so on. Because the user may be excited about accomplishing the difficult trick, the user may wish to share a rendered replay view 226 based on the rendered view 300 that includes celebratory items.

FIG. 3B illustrates a rendered replay view 350 that may have been rendered based on a modified version of the simulation state corresponding to rendered view 300. As noted above, the user included celebratory items 352(1)-352(5) in the rendered replay view 350. First, the rendered replay view 350 may have been modified to include last the background lighting (not illustrated) and items 352(1) and 352(2). More particularly, item 352(1) may be an animated shooting star that passes over the avatar 302 as the trick is completed while items 352(2) may be stars with a fixed position that emulate the appearance of stars in the night sky. Second, item 352(3) may be a chain of celebratory stars with a fixed position relative to the image frame rather than the environment of the game world. Next, item 352(4) may be a smiley emoji that is pinned to the head of the avatar 302 with position information that causes the emoji be positioned between the camera and the head of the avatar 302 and scaling information to size the emoji to cover the head and not the torso of the avatar 302. Finally, item 352(5) maybe a party hat item that is separate from the emoji of item 352(4) but which is pinned to a position atop the head of the smiley emoji relative to the camera. Because the items 352 are added to the simulation state(s), the positioning may be precise and determined without reliance on tools such as image recognition or manual positioning as would be required to insert items with similar effects into video captures.

Returning to FIG. 2, many other modifications may be made to the simulation state data. For example, the user may utilize the replay module 210 to use an alternative or additional camera and/or camera position, to remove an obstruction from the rendered replay view, to insert effect(s) (e.g., slow motion, background fade, multi-view, etc.), to change or add light source(s) and/or so on. In a particular example, a user may wish to share a ten second clip of the user performing various tricks in a first person skateboarding game. The user may provide replay input 220 to the replay module 210 to modify the camera from a first person perspective to a third person perspective, to control the camera position and orientation throughout the ten seconds of simulation state data, to turn off and on the visibility of a wall that would otherwise obstruct a desired view of the trick and to add a spotlight and a slow motion effect during the final trick of the clip. The replay module 210 may implement the modifications as changes to the simulation state data being provided to the rendering module 206 such that a rendered replay view 226 may be generated with the desired presentation of the captured gameplay.

It should be noted that, though FIGS. 1 and 2 include certain modules, components, and/or databases, the functionality discussed above may be performed by performed by different combinations of modules, components, and/or databases. For example, the replay module 210 may perform operations of the rendering module 206. Other examples may include additional elements and/or may not include some or any of the elements illustrated, with different modules, components, and/or databases performing some or all of the operations described herein.

Returning to FIG. 1, the user device(s) 134 may include functionality of the replay module 210 and rendering module 206. More particularly, such functionality may allow editing user(s) 136 to generate replay views on a device other than the game client devices 130. In some examples, the game system(s) 110 may include a simulation state database or similar database to which game client device(s) 130 may upload simulation state data. The user device(s) 134 may include a replay module 210 that may allow an editing user 136 to request simulation state data stored at the game system(s) 110 and perform requested modifications to the simulation state data. The rendering module 206 of the user device(s) 134 may then allow for the modified simulation state data to be rendered into a rendered replay view 226.

The user device(s) 134 may be any suitable device, including, but not limited to a Sony Playstation® line of systems, a Nintendo Switch® line of systems, a Microsoft Xbox® line of systems, any gaming device manufactured by Sony, Microsoft, Nintendo, or Sega, an Intel-Architecture (IA)® based system, an Apple Macintosh® system, a netbook computer, a notebook computer, a desktop computer system, a set-top box system, a handheld system, a smartphone, a personal digital assistant, combinations thereof, or the like. In general, the user device(s) 134 may execute programs (e.g., videographer clients) thereon to interact with the game system(s) 110 and perform the aforementioned functions. Game state information and simulation state data may be shared between the user device(s) 134 and the game system(s) 110 using any suitable mechanism, such as application program interfaces (APIs).

Of course, examples are not limited to those specifically described above and may include other variations such as an example in which the game system(s) 110 performs the replay functionality without involvement of the game client devices 130 and user devices 134 (e.g., other than as interface devices).

Some examples may provide for the merging or overlapping rendering of simulation states from one or more of different games or different periods of gameplay. Taking a soccer videogame and a basketball videogame as examples, a replay module may include functionality to merge the simulation state data on a per frame basis, with various effects being added to handle creation of the replay view. In particular example, a user may interact with the replay module to cause the merging of simulation state data from the soccer game and basketball game to generate simulation states for rendering that initially show the soccer game primarily on the left side of the frames beginning ten seconds before the player scores a particularly difficult goal while the basketball game is shown on the right side of the frames, beginning with a semi-translucent effect, beginning twenty seconds before the player makes a basket. Once the soccer goal is scored, the translucent effect may be shifted over a few seconds to the basketball game. In some examples, the overlap of the simulation states during replay does not cause conflicts because the replay module may not perform physics, movement or collision determinations on the models in the simulation states during replay. Of course, any number of simulation states, from different or the same game or different periods of gameplay may be merged with any number of effects which may be applied to groups of or single simulation states. Alternatively or additionally, the replay module may include functionality to perform merger of rendered video streams from rendered replay views, while applying effects to the rendered replay views to allow for merger of the view in a similar manner to that discussed above. Moreover, the replay module may allow for the combination of simulation states or rendered video streams, from different or the same game or different periods of gameplay, into a compilation, with or without merger of simulation states individually. Further, the replay module may also provide any number of other functions such as functions to create effects similar to those producible by a video editors.

In another variation, some systems may capture and store input data instead of, or in addition to, simulation states while still enabling modifications to simulation states in replay generation. For example, in a game system with a deterministic game engine, the simulation state capture module may capture an initial game simulation state and player inputs to the game engine with timing information from throughout the gameplay. A user may request replay of a gameplay segment via the replay module. The replay module may request and receive the stored initial game simulation state and player inputs and interact with the simulation module to regenerate the simulation state data. The user may interact with the replay module to perform modifications to the simulation state data and render the replay view as discussed above. Rather than or in addition to saving the modified simulation state data, the replay module may store modification information representing modifications to the simulation state indicated by the user. The stored initial game simulation state, player inputs and modification information may allow further modification or re-rendering of the modified simulation state data (e.g., upon subsequent regeneration of the simulation state data).

Other variations would be apparent based on this disclosure.

Figure 4:
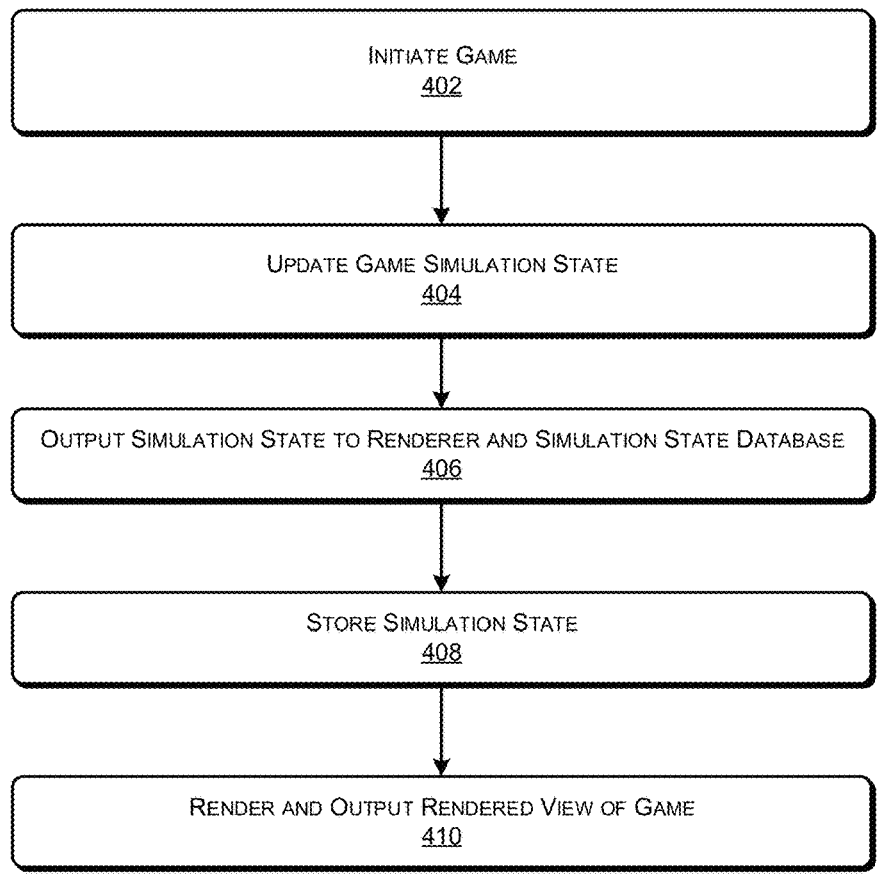
FIG. 4 illustrates a flow diagram of an example method that may provide for capture of simulation states from gameplay of a player, in accordance with example embodiments of the disclosure.

FIG. 4 illustrates a flow diagram of an example method 400 that may provide for capture of simulation state(s) from gameplay of a player, in accordance with example embodiments of the disclosure. The method 400 may be performed by the game client device 130 of the environment 100. More particularly, the method 400 may relate to the operations of a game client device to initiate a game and capture simulation states for later use in generating replay views of the gameplay.

At block 402, the game client device may initiate a game (possibly in conjunction with an online game system). The game client device may update the simulation state of the game at 404. In some examples, the game client device may update the game simulation state based on player inputs from a player input device and/or game state updates received from a game system hosting the game (e.g., if the game is an online game).

At 406, the game client device may output the simulation state for rendering. Depending on the example, a simulation state capture module may receive the simulation state and output the simulation state to a rendering module and a simulation state database. At 408, the simulation state database may store the simulation state (e.g., for later use in rendering replay views). Next, at 410, the rendering module may receive the simulation state, then render and output a rendered view of the game based thereon.

The process illustrated in FIG. 4 may return to 404 and continue during the duration of the game.

Figure 5:
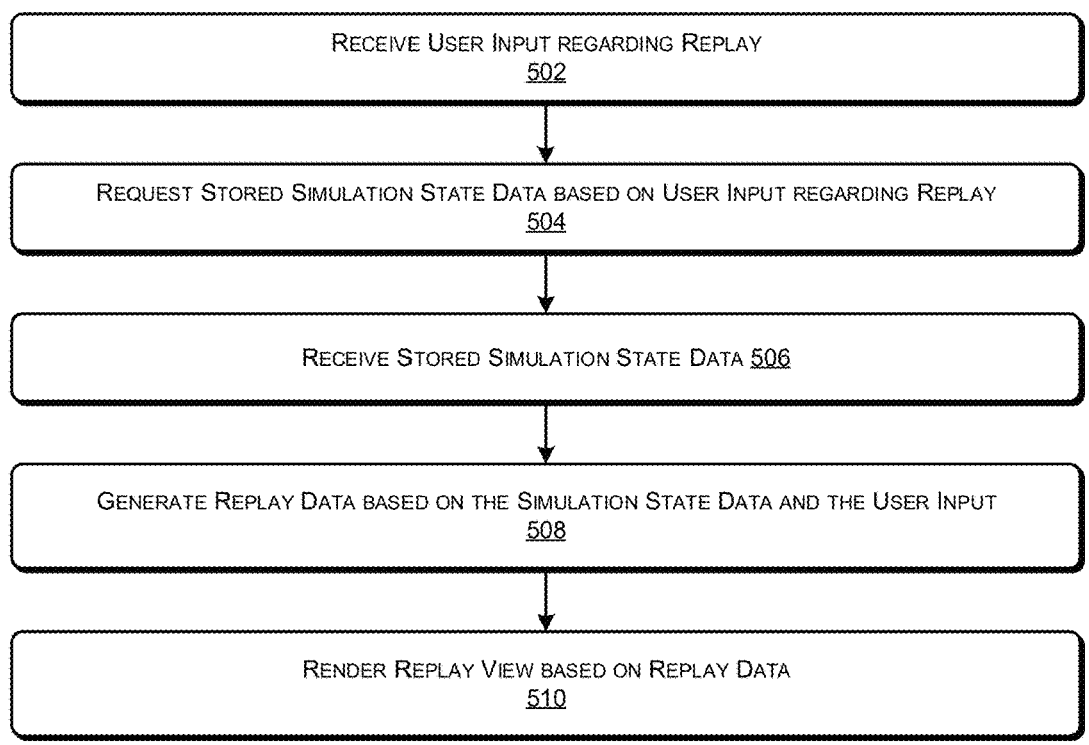
FIG. 5 illustrates a flow diagram of an example method to render replay views based on simulation states in accordance with example embodiments of the disclosure.

FIG. 5 illustrates a flow diagram of an example method 500 to render replay view(s) based on simulation states in accordance with example embodiments of the disclosure. The method 500 may be performed by the game client device(s) 130, individually or in cooperation with one or more other elements of the environment 100. Method 500 may be performed, for example, based on the details discussed above with regard to FIG. 1.

At block 502, the game client device may receive user input requesting a replay be rendered based on specified simulation state data. At block 504, a replay module of the game client device may request stored simulation state data based on the user input (e.g., request the corresponding simulation state data indicated by the user input). At block 506, the replay module may receive the requested simulation state data.

At block 508, the replay module may modify the simulation state data based on the user input to generate replay data. Then, at 510, the replay data may be provided to a rendering module which, in turn, may render a replay view based on the replay data.

It should be noted that some of the operations of methods 400-500 may be performed out of the order presented (e.g., block 404 could be performed by block 402 in some embodiments), with additional elements, and/or without some elements. Some of the operations of methods 400-500 may further take place substantially concurrently and, therefore, may conclude in an order different from the order of operations shown above.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

Figure 6:
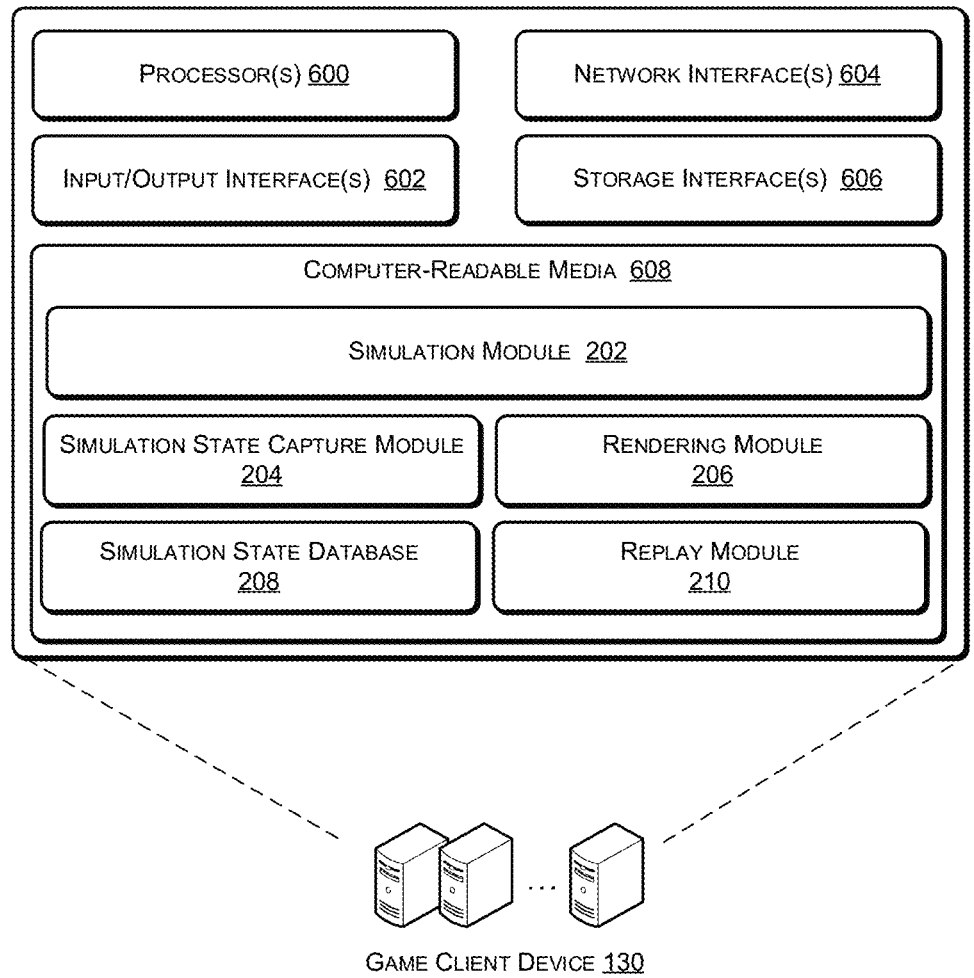
FIG. 6 illustrates a block diagram of example game client device(s) that may provide for capturing and/or editing simulation state data of gameplay in a video game such that a replay of the gameplay may be rendered and/or shared in accordance with examples of the disclosure.

FIG. 6 illustrates a block diagram of example game client device(s) 130 that may provide for capturing and/or editing simulation state data of gameplay in a video game such that a replay of the gameplay may be rendered and/or shared in accordance with examples of the disclosure. The game client device(s) 130 may include one or more processor(s) 600, one or more input/output (I/O) interface(s) 602, one or more network interface(s) 604, one or more storage interface(s) 606, and computer-readable media 608.

In some implementations, the processor(s) 600 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 600 may possess its own local memory, which also may store program modules, program data, and/or one or more operating system(s). The one or more processor(s) 600 may include one or more cores.

The one or more input/output (I/O) interface(s) 602 may enable the game client device(s) 130 to detect interaction with a user and/or other system(s), such as one or more game system(s) 110. The I/O interface(s) 602 may include a combination of hardware, software, and/or firmware and may include software drivers for enabling the operation of any variety of I/O device(s) integrated on the game client device(s) 130 or with which the game client device(s) 130 interacts, such as displays, microphones, speakers, cameras, switches, and any other variety of sensors, or the like.

The network interface(s) 604 may enable the game client device(s) 130 to communicate via the one or more network(s). The network interface(s) 604 may include a combination of hardware, software, and/or firmware and may include software drivers for enabling any variety of protocol-based communications, and any variety of wireline and/or wireless ports/antennas. For example, the network interface(s) 604 may comprise one or more of a cellular radio, a wireless (e.g., IEEE 802.1x-based) interface, a Bluetooth® interface, and the like. In some embodiments, the network interface(s) 604 may include radio frequency (RF) circuitry that allows the game client device(s) 130 to transition between various standards. The network interface(s) 604 may further enable the game client device(s) 130 to communicate over circuit-switch domains and/or packet-switch domains.

The storage interface(s) 606 may enable the processor(s) 600 to interface and exchange data with the computer-readable medium 608, as well as any storage device(s) external to the game client device(s) 130.

The computer-readable media 608 may include volatile and/or nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 608 may be implemented as computer-readable storage media (CRSM), which may be any available physical media accessible by the processor(s) 600 to execute instructions stored on the computer readable media 608. In one basic implementation, CRSM may include RAM and Flash memory. In other implementations, CRSM may include, but is not limited to, ROM, EEPROM, or any other tangible medium which can be used to store the desired information and which can be accessed by the processor(s) 600. The computer-readable media 608 may have an operating system (OS) and/or a variety of suitable applications stored thereon. The OS, when executed by the processor(s) 600 may enable management of hardware and/or software resources of the game client device(s) 130.

Several functional blocks having instruction, data stores, and so forth may be stored within the computer-readable media 608 and configured to execute on the processor(s) 600. The computer readable media 608 may have stored thereon a simulation module 202, a simulation state capture module 204, a rendering module 206, a simulation state database 208 and a replay module 210. It will be appreciated that each of the functional blocks 202-210 may have instructions stored therein that, when executed by the processor(s) 600, may enable various functions pertaining to the operations of game client device(s) 130.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system, comprising:
   one or more processors; and
   one or more computer-readable media storing computer-executable instructions that, when executed by the one or more processors, cause the one or more processors to perform operations comprising:
   generating, at a computing device of a player playing a video game, simulation state data for the video game, the simulation state data including one or more simulation states, the one or more simulation states including at least a model and pose state of an avatar corresponding to the player in a video game simulation;
   storing the simulation state data as stored simulation state data;
   rendering, based on the one or more simulation states of the simulation state data, one or more rendered views of the video game;
   outputting the one or more rendered views to a display of the computing device;

receiving at least one input requesting at least a replay of the simulation state data with at least one modification to the simulation state data;

receiving the stored simulation state data;

modifying, based on the at least one input, the stored simulation state data to generate modified simulation state data with one or more modified simulation states corresponding to the one or more simulation states;

rendering, based on the one or more modified simulation states of the modified simulation state data, one or more replay views including at least one replay view that at least partially differs from a corresponding one of the one or more rendered views; and outputting the one or more replay views to the display of the computing device.

2. The system of claim 1, wherein the video game is an online game and the generating the simulation state data for the player includes:

receiving host simulation state data of the online game from a game system hosting the online game;

receiving player input from the player; and generating the simulation state data based at least in part on the host simulation state data and the player input.

3. The system of claim 1, wherein the at least one modification to the simulation state data includes a modification to or addition of a camera in at least one of the one or more simulation states.

4. The system of claim 1, wherein the at least one modification to the simulation state data includes an addition of a visual in at least one of the one or more simulation states, the visual having a position relative to the avatar corresponding to the player in the video game simulation.

5. The system of claim 1, wherein the one or more simulation states include corresponding representations of the video game simulation of the video game the player is playing that are input to a rendering module to perform the rendering of the one or more rendered views of the video game.

6. The system of claim 1, wherein the operations further comprises:

receiving additional simulation state data corresponding to gameplay of the player in a different video game or during a different time period from the stored simulation state data;

wherein the modifying the stored simulation state data to generate the modified simulation state data further includes at least partially merging the additional simulation state data with the stored simulation state data such that at least one modified simulation state of the one or more modified simulation states includes a first model from the stored simulation state data and a second model from the additional simulation state data.

7. A computer-implemented method comprising:

receiving simulation state data, the simulation state data including one or more simulation states, the one or more simulation states including at least a model and pose state of an avatar corresponding to a player in a game simulation of a video game previously rendered as one or more rendered views;

receiving at least one input requesting at least a replay with at least one modification to the simulation state data;

modifying, based on the at least one input, the simulation state data to generate modified simulation state data with one or more modified simulation states corresponding to the one or more simulation states;

rendering, based on the one or more modified simulation states of the modified simulation state data, one or more replay views including at least one replay view that at least partially differs from a corresponding one of the one or more rendered views; and outputting the one or more replay views to a display of a computing device.

8. The computer-implemented method of claim 7, further comprising:

generating, during gameplay of the video game, generated simulation state data that includes the one or more simulation states;

storing the generated simulation state data as stored simulation state data, wherein the receiving the simulation state data receives the stored simulation state data;

rendering, based on the one or more simulation states of the generated simulation state data, the one or more rendered views of the video game; and outputting the one or more rendered views to the display of the computing device.

9. The computer-implemented method of claim 8, wherein the video game is an online game and the generating the generated simulation state data includes:

receiving host simulation state data of the online game from a game system hosting the online game;

receiving player input from the player; and generating the generated simulation state data based at least in part on the host simulation state data and the player input.

10. The computer-implemented method of claim 7, wherein the at least one modification to the simulation state data includes a modification to or addition of a camera in at least one of the one or more simulation states.

11. The computer-implemented method of claim 7, wherein the at least one modification to the simulation state data includes an addition of a visual in at least one of the one or more simulation states, the visual having a position relative to the avatar corresponding to the player in the game simulation.

12. The computer-implemented method of claim 7, wherein the one or more simulation states include corresponding representations of the game simulation that are input to a rendering module to perform the rendering of the one or more rendered views.

13. The computer-implemented method of claim 7, further comprising:

receiving additional simulation state data corresponding to gameplay of the player in a different video game or during a different time period from the simulation state data;

wherein the modifying the simulation state data to generate the modified simulation state data further includes at least partially merging the additional simulation state data with the simulation state data such that at least one modified simulation state of the one or more modified simulation states includes a first model from the simulation state data and a second model from the additional simulation state data.

14. One or more non-transitory computer-readable media storing computer-executable instructions that, when executed by one or more processors, cause the one or more processors to perform operations comprising:
receiving simulation state data including one or more simulation states, the one or more simulation states including at least a model and pose state of an avatar corresponding to a player in a game simulation of a video game previously rendered as one or more rendered views;
receiving at least one input requesting at least a replay with at least one modification to the simulation state data;
modifying, based on the at least one input, the simulation state data to generate modified simulation state data with one or more modified simulation states corresponding to the one or more simulation states;
rendering, based on the one or more modified simulation states of the modified simulation state data, one or more replay views including at least one replay view that at least partially differs from a corresponding one of the one or more rendered views; and
outputting the one or more replay views to a display of a computing device.

15. The one or more non-transitory computer-readable media of claim 14, the operations further comprising:
generating, during gameplay of the video game, generated simulation state data that includes the one or more simulation states;
storing the generated simulation state data as stored simulation state data, wherein the receiving the simulation state data receives the stored simulation state data;
rendering, based on the one or more simulation states of the generated simulation state data, the one or more rendered views of the video game; and
outputting the one or more rendered views to the display of the computing device.

16. The one or more non-transitory computer-readable media of claim 15, wherein the video game is an online game and the generating the generated simulation state data for the player includes:
receiving host simulation state data of the online game from a game system hosting the online game;
receiving player input from the player; and
generating the generated simulation state data based at least in part on the host simulation state data and the player input.

17. The one or more non-transitory computer-readable media of claim 14, wherein the at least one modification to the simulation state data includes a modification to or addition of a camera in at least one of the one or more simulation states.

18. The one or more non-transitory computer-readable media of claim 14, wherein the at least one modification to the simulation state data includes an addition of a visual in at least one of the one or more simulation states, the visual having a position relative to the avatar corresponding to the player in the game simulation.

19. The one or more non-transitory computer-readable media of claim 14, wherein the one or more simulation states include corresponding representations of the game simulation that are input to a rendering module to perform the rendering of the one or more rendered views.

20. The one or more non-transitory computer-readable media of claim 14, the operations further comprising:
receiving additional simulation state data corresponding to gameplay of the player in a different video game or during a different time period from the simulation state data;
wherein the modifying the simulation state data to generate the modified simulation state data further includes at least partially merging the additional simulation state data with the simulation state data such that at least one modified simulation state of the one or more modified simulation states includes a first model from the simulation state data and a second model from the additional simulation state data.

* * * * *